(12) United States Patent
Brown et al.

(10) Patent No.: US 8,551,345 B2
(45) Date of Patent: Oct. 8, 2013

(54) PRODUCTION FLUID SOLID TRAP

(71) Applicant: Petroleos de Venezuela, S.A., Caracas (VE)

(72) Inventors: Juan Brown, Campo Morichal (VE); Alvaro Quezada, Campo Morichal (VE)

(73) Assignee: Petroleos de Venezuela, S.A., Caracas (VE)

( * ) Notice: Subject to any disclaimer, the term of this patent is extended or adjusted under 35 U.S.C. 154(b) by 0 days.

(21) Appl. No.: 13/647,437

(22) Filed: Oct. 9, 2012

(65) Prior Publication Data

US 2013/0032549 A1 Feb. 7, 2013

Related U.S. Application Data

(62) Division of application No. 12/772,297, filed on May 3, 2010, now Pat. No. 8,454,843.

(51) Int. Cl.
B01D 21/02 (2006.01)
B01D 21/24 (2006.01)
E21B 43/34 (2006.01)

(52) U.S. Cl.
CPC ............ B01D 21/02 (2013.01); B01D 21/2405 (2013.01); B01D 21/2444 (2013.01); B01D 21/245 (2013.01); E21B 43/34 (2013.01)
USPC ........ 210/801; 210/803; 210/532.1; 210/533; 166/267; 166/75.12

(58) Field of Classification Search
USPC .............. 210/800, 801, 803, 519, 532.1, 533, 210/534, 535, 537; 95/253; 96/184; 166/267, 75.12
See application file for complete search history.

(56) References Cited

U.S. PATENT DOCUMENTS

| | | | |
|---|---|---|---|
| 1,494,670 A | | 5/1924 | Delaney et al. |
| 1,660,697 A | * | 2/1928 | Webb ............................ 210/533 |
| 2,058,044 A | * | 10/1936 | Spencer ........................ 210/533 |
| 2,349,944 A | | 5/1944 | Dixon |
| 2,423,793 A | | 7/1947 | Olivo et al. |
| 3,318,448 A | | 5/1967 | Fryer |
| 3,766,719 A | | 10/1973 | McAnally, III |
| 4,257,895 A | * | 3/1981 | Murdock ..................... 210/532.1 |
| 4,400,271 A | * | 8/1983 | Lunceford .................... 210/533 |
| 4,539,023 A | | 9/1985 | Boley |
| 5,558,780 A | | 9/1996 | Vancas |
| 6,099,743 A | * | 8/2000 | Pedersen ....................... 210/801 |
| 6,214,092 B1 | | 4/2001 | Odom et al. |
| 6,350,375 B1 | | 2/2002 | Bringedal et al. |
| 6,419,730 B1 | | 7/2002 | Chavez |
| 6,468,335 B1 | * | 10/2002 | Polderman ..................... 95/253 |
| 6,537,458 B1 | | 3/2003 | Polderman |
| 6,983,852 B2 | | 1/2006 | Hemstock et al. |
| 7,278,543 B2 | | 10/2007 | Sagatun et al. |
| 7,731,037 B2 | | 6/2010 | Frazier et al. |
| 2005/0150842 A1 | | 7/2005 | Puik |

* cited by examiner

Primary Examiner — Christopher Upton
(74) Attorney, Agent, or Firm — Bachman & LaPointe, P.C.

(57) ABSTRACT

A convenient, cost effective and efficient solid separation apparatus and method of removing solid material from production fluid is disclosed. The solids separation apparatus includes a fluid inlet pipe; a fluid outlet pipe; a vessel that is a fluid velocity driven solid settlement inducement structure and/or a fluid vector driven solid settlement inducement structure; at least one solid discharge opening within the vessel longitudinally spaced between the fluid inlet pipe and the fluid outlet pipe; and, a tank disposed below the vessel with at least one solid entry opening communicated with the at least one solid discharge opening.

16 Claims, 1 Drawing Sheet

PRODUCTION FLUID SOLID TRAP

BACKGROUND OF THE INVENTION

This invention relates generally to the field of oil well production, more particularly, but not by way of limitation, to a separating apparatus. This invention relates to equipment useful in separating heterogeneous mixtures of at least two components, more particularly, sand from production fluid streams.

Many different areas of industry require the separation of heterogeneous mixtures. Productions from wells in the oil and gas industry often contain particulates, such as sand. These particulates may be part of the formation from which the hydrocarbon is being produced, such as compounded sand that forms the rock of the reservoir. The particulates may be introduced from hydraulic fracturing or fluid loss material from drilling mud fracturing fluids or from phase change of produced hydrocarbons caused by changing conditions at the wellbore. As the particulates are produced, problems occur due to abrasion and plugging of production equipment.

Various devices have been used to remove solids from production fluids. The solid material is removed by mechanical clarification, which is followed by sedimentation in a clarifier. The solid material is removed by filtration or sedimentation storage. Since the fluid and solid are transported through the system together, these methods lead to the erosion of equipment and added expense associated with sedimentation times.

SUMMARY OF THE INVENTION

The primary object of the present invention is the creation of a device that allows for a quick, convenient and inexpensive removal of solids from production fluids.

It is a further object of the present invention to provide a method of removing solids from production fluids.

In accordance with the present invention a solids separation apparatus is disclosed. The solids separation apparatus of the present disclosure comprises a vessel having a fluid inlet, a fluid outlet, at least one solid discharge opening in a gravitational bottom of the vessel longitudinally spaced between the fluid inlet and the fluid outlet, wherein the vessel is selected from the group consisting of fluid velocity driven solid settlement inducement structures, fluid vector driven solid settlement inducement structures, and combinations thereof; and, a tank disposed below the vessel having at least one solid entry opening communicated with the at least one solid discharge opening.

In further accord with the present invention a method of separating solids from production fluid is disclosed. The method of continuously separating solids from production fluid of the present disclosure comprises the following steps of: connecting a solid removal device to a production line, wherein the solid removal device is comprised of a vessel having a fluid inlet, a fluid outlet, at least one solid discharge opening in a gravitational bottom of the vessel longitudinally spaced between the fluid inlet and the fluid outlet, wherein the vessel is selected from the group consisting of fluid velocity driven solid settlement inducement structures, fluid vector driven solid settlement inducement structures and combinations thereof; and, a tank disposed below the vessel having at least one solid entry opening communicated with the at least one solid discharge opening; and, flowing production fluid through the solids removal device so as to separate solids from the fluid and collect them in the tank.

BRIEF DESCRIPTION OF THE DRAWINGS

A detailed description of preferred embodiments of the present invention follows, with reference to the attached drawings, wherein.

DETAILED DESCRIPTION

The invention relates to solid-liquid separation. A cost effective solids trap device attaches to the production stream/production line and removes solids, such as sand, by changing the velocity or flow direction of the fluid. Sand and any other solid materials which may be entrained in the liquid to be treated including oxide shells, metallic filings, packing materials and the like, may be removed by the solid-liquid separation device of the present invention.

Hereinafter the term "fluid" is used to refer to any one or all of the following terms: oil, gas, water, production fluid and the like.

The solids separation apparatus of the present invention is equipped with two chambers, for example a vessel and a tank, which allow for the separation of the solid from the fluid within a production line. The solids separation apparatus is cost effective because it is directly attached to the production line on the wellhead or at a flow station. The fluid is not diverted into a separation tank or a sedimentation tank. Since the solids separation apparatus may be attached at the wellhead, the remainder of the production equipment is not exposed to heavy abrasion from the heterogeneous fluid.

In order to achieve the removal of solid material from the production fluid at the wellhead or anywhere throughout the production line, the solids separation apparatus of the present invention is attached to the production tubing. The solids separator may be attached to the production tubing by any method, which is well known within the piping, or tubing arts. In order to facilitate easy access to the separation device, valves may be incorporated on the production tubing at both ends of the attached separation device.

Figure 1:
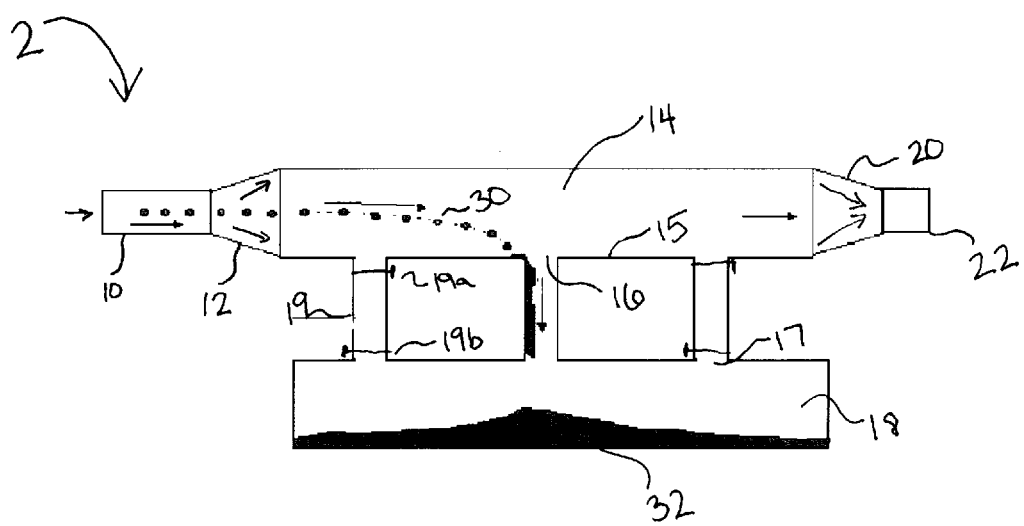
FIG. 1 illustratively depicts a non limiting embodiment of the solids trap through fluids expansion; and, FIG. 2 illustratively depicts a non-limiting embodiment of the solids trap through flow direction.

An embodiment of the separation device 2, i.e. sand trap, of the present invention is illustrated in FIG. 1. Production fluid flows in the direction of the arrows into sand trap 2, for example through fluid inlet pipe 10. Vessel 14 in this embodiment is a fluid velocity driven solid settlement inducement structure. Vessel 14 and/or pipe 10 define an increased cross-sectional flow area 12 that is larger than the fluid inlet pipe 10 and preferably the fluid outlet pipe 22 as well. For instance, fluid inlet pipe 10 may taper outward to define an increased cross-sectional flow area 12. As sand 30 flows into inlet pipe 10, outwardly tapered inlet-end wall 12 expands the mass flow area thus reducing the velocity of the fluid flow. The larger mass flow area of the vessel 14 as compared to the mass flow area of the inlet pipe 10 facilitates reduced velocity through the entire length of vessel 14. The slower fluid velocity, i.e. slower mass flow rate, cannot maintain the mass of the heavier solid particles. The solid particles begin to settle 30 in the decantation/settlement zone of vessel 14. As more fluid enters vessel 14, more solid settles to the bottom of vessel 14 and the fluid continues to push its way across the length of the vessel until it reaches the inwardly tapered outlet end wall 20. The inward taper preferably reduces the flow area of vessel 14 back to the original area of inlet pipe 10. By the time the fluid reaches outlet pipe 22, the fluid has substantially regained its original velocity.

Continuing on FIG. 1, the gravitational bottom 15 of vessel 14 has at least one solid discharge opening 16 longitudinally spaced between the increased cross-sectional flow area 12 and the decreased cross-sectional flow area 22. Decanted solid 30 falls from vessel 14 through solid discharge opening 16 through connection 19 and solid entry opening 17 into tank 18. The collected solid 32 is stored within tank 18 until cleaning.

Solid discharge connection 19 is a vertical section that connects to vessel 14. Valves 19a, 19b are positioned at the top and bottom of solid discharge connection 19. The valves 19a, 19b are preferably in the open position when the separation device 2 is working to allow solids to enter tank 18. When the separation device 2 is not working, for example to clean tank 18, the valves 19a, 19b are closed. When the top valve 19a is closed, tank 18 may be opened by a tank 18 access valve, window, door or the like. The collected sand 32 may then be emptied from tank 18. Once emptied, in order to place the separation device 2 back in the working position, the solid discharge connection 19 top valve 19a may then be opened. As shown in FIG. 1, a plurality of solid discharge openings 16, solid discharge connections 19, solid entry openings 17 and solid discharge valves 19a, 19b may be positioned throughout the length of vessel 14.

The solid-liquid separator of the present invention is designed for specific use depending upon the specific weight of solids to be separated from the specific liquid material. The device is designed according to the components within the liquid material and the solids to be separated. The speed of the liquid phase may differ due to differing qualities of oil produced, quantities of gas in the oil produced and quantities of water in the oil produced. The solid phase may differ due to the differing types of solid materials and the size of the solid granules.

The size and dimensions of the solid-liquid sand separator can be determined on a specific site-by-site basis. The factors needed to determine the flow velocity needed for the specific solid phase to settle from the specific liquid phase is calculated by manipulation of Stokes Law, Newton's Law and Archimedes' Principal. Manipulation leads to the following equation of motion balance within the solid-liquid separation device of the present invention:

$$m_a = E + F_r - m_g$$
$$m_g - E = F_r$$
$$\rho_p \frac{4}{3}\pi R^3 g \quad \rho_f \frac{4}{3}\pi R^3 g \quad 6\pi R \mu v_p$$

This leads to the following equation for the velocity employed in order to obtain particle sedimentation:

$$v_p = \frac{2g(\rho_p - \rho_f)R^2}{9\mu}$$

wherein
$\rho_p$ is the density of the particle;
$\rho_f$ is the density of the fluid;
R is the radius of the spherical object, such as the particle;

g is the gravitational constant;
$v_p$ is the velocity of the particle; and,
$\mu$ is the viscosity of the fluid.

Determining the particle velocity in this way allows an approximation of the actual desired velocity of the fluid carrying the particle that will result in sedimentation of the particle.

Figure 2:
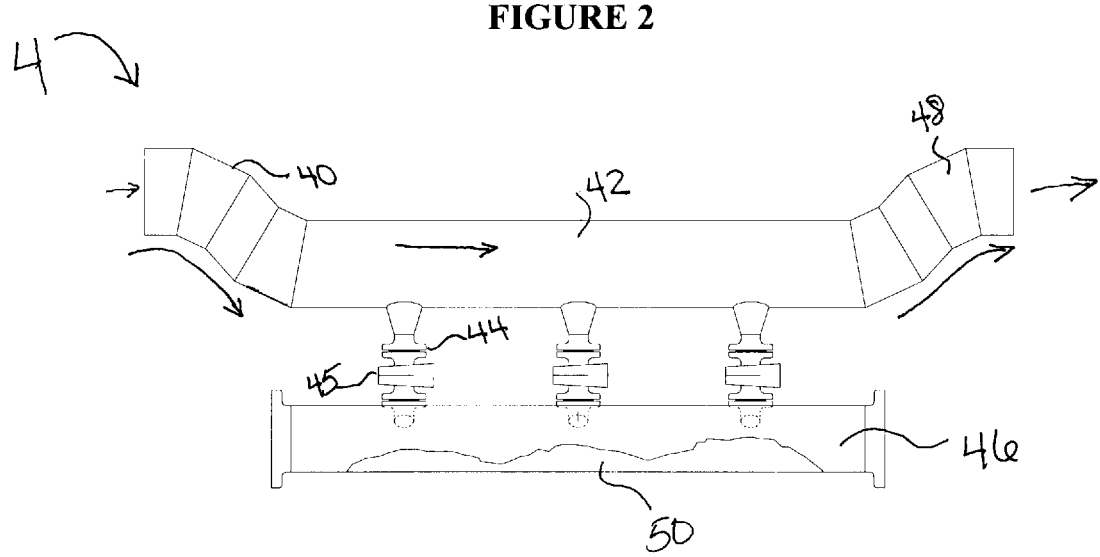

FIG. 2 depicts another non-limiting embodiment of the sand trap. Vessel 42 in this embodiment is a fluid vector driven solid settlement inducement structure. Inlet opening 40 in this embodiment is a downward S curve. The downward S curve is one variation of a fluid vector-altering opening of the inlet-end wall. Any opening that will change the direction of the flow velocity of the production fluid upon entry into the sand trap may be implemented in this embodiment. As fluid enters the sand trap 4 flowing in the direction of the arrows, the original direction in flow velocity is changed by the fluid vector-altering opening of the inlet-end wall. This change in the direction of the flow velocity vector initiates a decanting of the solid. The necessary change in direction of the vector of the inlet-end wall needed to initiate the decantation of the solid material is a function of the mass of the liquid material, the mass of the solid material and the flow conditions. The specific vector is calculated by manipulation of Stokes Law, Newton's Law and Archimedes' Principal.

Continuing on FIG. 2, solid 50 falls to the bottom of vessel 42 through connection 44 and valve 45 into tank 46. As fluid flows through vessel 42, the vector change facilitates the decantation of solid throughout the length of vessel 42. As fluid enters vessel 42, the inlet vector change initiates a downward velocity to the solid particles, which hit the bottom of vessel 42 and further settle into tank 46. As fluid reaches the end of vessel 42, it encounters an upward S curve fluid outlet 48, i.e. a fluid vector-altering opening of the outlet end wall. The fluid vector-altering opening of the outlet end wall fluid outlet 48 continues the downward velocity of the solid particles as the fluid substantially resumes its original vector. As shown in FIG. 2, a plurality of connections 44 and valves 45 may be positioned throughout the length of vessel 42.

The solids collection apparatus of the present invention is attached to production fluid piping. The solids collection apparatus may be attached to the production tubing by any method that is well known within the piping art, well production arts or tubing arts. In order to facilitate cleaning and/or by-pass, the apparatus may be attached with on/off valves on either side of the assembly and/or the apparatus may be attached with a by-pass valve and piping. The apparatus is attached in a manner that will substantially align the fluid inlet with the fluid outlet.

After the apparatus is attached, a heterogeneous mixture of liquid-solid production fluid enters the apparatus. In order to remove the solid material in a flow line, the apparatus may be installed before the fluid inlet of any compatible equipment, such as a pump, container or the like. The velocity and/or vector of the production fluid is manipulated upon entry into the fluid inlet of the apparatus. This change in velocity and/or vector facilitates a decantation of the solid material within the production fluid. The solid material decants within the inner vessel of the apparatus. Depending upon whether change in velocity or change in vector is used to induce the solid separation, the inner vessel may have the same cross-sectional flow area as the fluid inlet and fluid outlet or the inner vessel may be larger in cross-sectional flow area than the fluid inlet and fluid outlet. As the solid material decants or is forced downward to the bottom of the apparatus vessel where it encounters solid discharge openings longitudinally spaced between the inlet of the vessel and the outlet of the vessel.

The solid material falls from the bottom of the vessel through the solid discharge opening into a solid entry opening of a tank. The tank is positioned below the vessel. The tank is attached to the vessel through connections that are assembled to allow the flow of solid material from the vessel to the tank.

The liquid material continues down the length of the vessel as the solid material continues to decant or is forced downward. The liquid material exits the vessel through the fluid outlet. The liquid material obtains substantially the same velocity and/or vector as it exits the apparatus. The solid material settles in the tank and is then collected by any procedure that is well known within the art.

The solids separation apparatus of the present invention may be implemented in other possible applications. Since the separation effects of the present invention are based upon a continuous flow of liquid material effected by a change in velocity and/or vector, the apparatus may be employed in a variety of technologies in a variety of sizes. The final characteristics of the solids separation apparatus of the present invention may be applied to conventional well technology, piping technology, sewage technology, solid-liquid separation technology and any application that may benefit from the solid-liquid separation properties of the present invention.

It is to be understood that the invention is not limited to the illustrations described and shown herein, which are deemed merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A solids separation apparatus, comprising:
    a vessel having a fluid inlet, a fluid outlet, a conduit disposed therebetween, and at least one solid discharge opening in a gravitational bottom of the conduit longitudinally spaced between the fluid inlet and the fluid outlet, wherein the vessel is a fluid vector driven solid settlement inducement structure, wherein the fluid inlet changes the vector of incoming fluid in a downward direction, and wherein the fluid outlet changes the vector of a fluid in an upward direction, and wherein the conduit extends from the fluid inlet to the fluid outlet substantially free of any flow obstructions therebetween; and
    a tank disposed below the vessel having at least one solid entry opening communicated with the at least one solid discharge opening.

2. The solids separation apparatus of claim 1, wherein the conduit is cylindrical.

3. The solids separation apparatus of claim 1, wherein the vessel has a second solid discharge opening disposed between the at least one solid discharge opening and the fluid outlet, and the tank has a second solid entry opening communicating with the second discharge opening.

4. The solids separation apparatus of claim 1, wherein the fluid outlet is substantially axially aligned with the fluid inlet.

5. The solids separation apparatus of claim 1, further comprising a valve between the conduit and the tank.

6. The solids separation apparatus of claim 1, wherein the fluid vector driven solid settlement inducement structure comprises at least one structure disposed along a flow path from the fluid inlet, through the conduit and to the fluid outlet.

7. A method of separating solids from production fluid comprising the following steps:
    connecting a solid removal device to a production line, wherein the solid removal device comprises
    a vessel having a fluid inlet, a fluid outlet, a conduit disposed therebetween, and at least one solid discharge opening in a gravitational bottom of the conduit longitudinally spaced between the fluid inlet and the fluid outlet, wherein the vessel is a fluid vector driven solid settlement inducement structure, wherein the fluid inlet changes the vector of incoming fluid in a downward direction, and wherein the fluid outlet changes the vector of a fluid in an upward direction, and wherein the conduit extends from the fluid inlet to the fluid outlet substantially free of any flow obstructions therebetween; and
    a tank disposed below the vessel having at least one solid entry opening communicated with the at least one solid discharge opening; and
    flowing production fluid through the solids removal device so as to separate solids from the fluid and collect them in the tank.

8. The method of separating solids from production fluid of claim 7, wherein the conduit is cylindrical.

9. The method of separating solids from production fluid of claim 7, wherein solids separate from the fluid in and after the inlet to the bottom of the vessel, through the at least one solid discharge opening and the at least one solid entry opening and into the tank.

10. The method of separating solids from production fluid of claim 7, wherein the conduit has a second solid discharge opening disposed between the at least one solid discharge opening and the fluid outlet, and the tank has a second solid entry opening communicating with the second discharge opening.

11. The method of separating solids from production fluid of claim 7, wherein the fluid outlet is substantially axially aligned with the fluid inlet.

12. The method of separating solids from production fluid of claim 7, wherein the fluid is oil production fluid.

13. The method of separating solids from production fluid of claim 7, wherein the solid removal device further comprises a valve between the conduit and the tank.

14. The method of separating solids from production fluid of claim 13, wherein the valve is in the open position when the solid removal device is working to allow solids to enter the tank.

15. The method of separating solids from production fluid of claim 13, wherein the valve is in the closed position when the collected solids are emptied from the tank.

16. A solids separation apparatus, comprising:
    a vessel having a fluid inlet, a fluid outlet, a conduit disposed therebetween, and at least one solid discharge opening in a gravitational bottom of the conduit of the vessel longitudinally spaced between the fluid inlet and the fluid outlet, wherein the vessel is fluid vector driven solid settlement inducement structure, wherein the fluid vector driven solid settlement inducement structure comprises at least one structure disposed along a flow path from the fluid inlet, through the conduit and to the fluid outlet, wherein the at least one structure comprises a downward S curve at the fluid inlet and an upward S curve at the fluid outlet; and
    a tank disposed below the vessel having at least one solid entry opening communicated with the at least one solid discharge opening.

* * * * *